April 2, 1968 H. M. SONTAG 3,376,506

COMBINED PAGING AND INTERCOMMUNICATION SYSTEM WITH SEPARATE PAGING REPLY LINE COMMON TO ALL STATIONS

Filed Dec. 10, 1965 2 Sheets-Sheet 1

INVENTOR
HOWARD M. SONTAG
BY
Burgess, Dinklage & Sprung
ATTORNEYS.

INVENTOR
HOWARD M. SONTAG
BY
Burgess, Dinklage + Sprung
ATTORNEYS.

United States Patent Office 3,376,506
Patented Apr. 2, 1968

3,376,506

COMBINED PAGING AND INTERCOMMUNICATION SYSTEM WITH SEPARATE PAGING REPLY LINE COMMON TO ALL STATIONS

Howard M. Sontag, Roslyn, N.Y., assignor to Executone, Inc., Long Island City, N.Y., a corporation of New York Filed Dec. 10, 1965, Ser. No. 513,052
14 Claims. (Cl. 325—64)

This invention relates in general to intercommunication systems or intercom systems as they are commonly termed, and more particularly to an audio intercom system featuring a selective paging signal link and a reservable paging reply audio link.

Essentially, the invention is based upon a type of intercom system having one or more master stations, any of which can function either as a calling station or as a reply station, and a plurality of staff or reply stations, which need only be capable of reply audio communication with a contacting calling station and need not be capable of initiating calls to other stations.

In its basic embodiments, the paging intercom system of the invention includes a calling station, a plurality of reply stations, circuit means defining a corresponding set of audio communication lines between the calling station and each of the reply stations, circuit means defining a paging reply line for audio communication between the calling station and and single reply station connected to the reply line, a call switching circuit means, a reply switching circuit means associated with each reply station, a paging signal transmitter, and at least one paging receiver. The call switching circuit means is provided for selectively connecting the calling station to an audio communication line corresponding to a given reply station for audio communication therewith over such line, and for selectively connecting the calling station to the paging reply line for audio communication with a reply station connected to the reply line by means of its associated reply switching circuit. The reply switching circuit means associated with each reply station is provided for selectively connecting that reply station to its corresponding audio communication line for audio communication with the calling station thereover and for selectively connecting such reply station to the paging reply line as previously indicated. Thus, the invention provides for audio communication between the calling station and a selected reply station, and also for audio communication from any reply station to the calling station when said calling station and such reply station are connected to the reply line by the call and reply switching circuit means.

Thte paging signal transmitter is disposed for activation at the calling station to transmit a paging signal characteristic of the party being paged, with such signal being received by all paging receivers, but indicated only at the receiver corresponding to the particular party being paged. Preferably, the paging receivers are of the pocket portable type so as to be conveniently carried by those persons intended to be provided with paging service.

The invention contemplates a paging system wherein the paging signal is encoded in such a manner that upon its transmission, only the receiver carried by the person intended to be paged will respond to the paging signal, so that a plurality of parties can be accommodated without interference by the system. Of course, where it is desired only to provide for the paging of one party, there is no need to use an encoded paging signal, and in such case, a simpler transmitter and receiver combination can be used. However, for most practical applications of the invention, the paging signal is encoded, either by carrier frequency and/or modulation, and each paging receiver is provided with signal decoding means which activates an indicator device, such as a beep tone generator, light, buzzer, etc., also provided in the receiver upon receipt of a paging signal encoded for response by that particular receiver.

For example, the paging signal transmitter can be constructed so as to be capable of transmitting any selected one of a number of distinct carrier frequency signals each frequency representing a corresponding paging party. In such case, each party to be paged is provided with a receiver which is responsive only to the paging signal frequency assigned to him. Of course, two or more parties can be paged simultaneously by providing them each with a receiver responsive to the same type or frequency paging signal.

Under normal operating procedure, communication with a particular party is first attempted by calling him at a selected reply station, such as one believed to be in proximity to that party. This is accomplished by switching the calling station and the selected reply station into connection with the audio communication line corresponding to such reply station. If this attempt to contact the intended party at the selected reply station is unsuccessful for any reason, such as for example, no response is obtained therefrom, or if a response is obtained, such response is not that of the intended party, that party is then paged by activating the paging signal transmitter. Upon initiating paging action, the calling station is then switched for audio communication over the reply line, thus freeing the originally selected reply station for receiving other communications, and enabling the paged party, after receiving indication of the paging signal, to contact the calling station simply by going to any reply station and switching it for connection to the reply line.

Hence, the invention provides a paging intercom system wherein the primary audio communication traffic is carried over one set of lines between the calling and reply stations, and the audio communication resulting from successful paging action is carried over another line, the reply line which is reserved for such purpose.

While the call switching circuit means used for connecting the calling station to either a selected audio communication line or to the reply line as required, can be manually operated, it is preferable to provide a control circuit means, such as a relay, etc., which is operatively connected to the call switching circuit and to the paging signal transmitter for activating same and for effecting connection of the calling station to the reply line upon activation of the paging signal transmitter. In this way, upon initiating paging action, the calling station will be automatically switched to the reply line so as to "meet" such reply station as is connected thereto by the paged party acting in response to the paging action taken at the calling station.

The invention also provides for direct paging of any selected party without the need for first attempting to communicate with him at a reply station. This is accomplished simply by activating the paging signal transmitter and then switching the calling station onto the reply line to await communication with the paged party through any reply station which he connects to the reply line. This feature of the invention permits any party carrying a paging receiver to be contacted from the calling station secretly, since because of the paging signal encoding, only the intended party will be aware of the fact that someone at the calling station desires to communicate with him.

To prevent tie-up of the paging portion of the system, the invention provides a resettable timer means operatively connected to the paging signal transmitter to effect the transmission thereby of a paging signal of predetermined duration upon each activation of the transmitter. Preferably, this timer means or a separate timer means synchronized therewith is also operatively connected to the call switching circuit means for disconnecting the calling station from the reply line at a predetermined time interval after the calling station has been connected thereto by the call switching circuit means. This assures that after a reasonable time, any calling station which has been switched to the reply line to await a reply from a paged party will be disconnected from the reply line to permit use thereof in paging action by another calling station. In this way, a single reply line can serve to accommodate several calling stations one at a time. Otherwise in the event of unsuccessful paging action by one calling station, the reply line could be tied up indefinitely by one calling station. Of course, in applications of the invention wherein only one calling station is provided, it is not necesary to provide such timer disconnecting means.

Preferably, the timer means is arranged to permit unlimited duration communication over the reply line from the answering reply station, so that once the paged party had responded, communication with the calling station would not be automatically terminated. Accordingly, the timer means is operable to free the reply line only in the event that no reply station is connected thereto.

To accommodate audio communication between any one of a plurality of calling stations and any one of another plurality of reply stations without interference, the invention provides lockout circuit means which prevents the parallel connection of any other calling or reply station to an audio communication line already connected with a calling station and its associated reply station. Such lockout circuit means can also, and preferably includes circuit means for establishing a busy signal sensible at any station which attempts connection into a communication line being used.

A variety of circuit configurations including active and/or passive elements and electrical energy sources can be used as the lockout circuit means in the system of the invention.

In accordance with the preferred embodiment of the invention, such lockout function is accomplished by means of relays having contact sets which short-circuit a portion of their coils. One of these short-out relays is provided in the call switching circuitry associated with each calling station. The purpose of using short-out relays is to effect a change in the level of a DC voltage superimposed upon the audio line set to which the associated calling station is connected for audio communication with a corresponding reply station. This is done by supplying the relay current through the audio line from a DC source connected therewith through a series resistor. When the calling station is initially connected to the audio line, the relay shorting contacts are open and the DC voltage on the line is equal to the source voltage multiplied by the ratio of the full relay coil DC resistance to the sum of the series resistor and full coil resistances. When the short-out relay operates, its contacts will effect a reduction in the DC voltage on the audio line because with a portion of the relay coil shorted out, the line voltage will be equal to the source voltage multiplied by the ratio of the lesser remaining coil resistance to the sum of the series resistor and remaining coil resistances. This arrangement provides sufficient voltage on the audio line to effect initial operation of the short-out relay, and a reduced voltage on the audio line sufficient to hold the relay in after operating, but yet not enough to permit the short-out relay of another calling station to be operated from the same audio line. Thus, the first calling station connected to a particular audio line will effect the exclusion of other calling stations from that line, because the short-out relays of such other calling stations cannot operate once the first calling station is connected to the line. Such exclusion can be implemented simply by providing an additional contact set or sets on each short-out relay each of which are connected to normally block the audio output of their respectively associated calling stations.

A similar lockout circuit arrangement can be provided for the reply line to inhibit the connection thereto of any other calling station once a first calling station has been connected thereto.

One of the advantages afforded by the lockout feature or "busy" indicating feature of the invention is that it is not necessary to establish a predetermined preference among calling stations with respect to the use of the audio and reply lines. This simplifies the installation and operation of the over-all paging communication system because the use of any particular audio line or the reply line as among a plurality of calling stations is on a first connection basis.

Other advantages of the invention are to be found in its features which provide for the superposition of DC voltages on the audio and reply lines for effecting automatically controlled operation of the various circuits provided for call and reply switching.

It is therefore, an object of the invention to provide a paging communication system including a wireless paging signal transmission link.

Another object of the invention is to provide a system as aforesaid which can accommodate a plurality of separate audio communications between a plurality of calling stations and a respective plurality of reply stations.

A further object of the invention is to provide a system as aforesaid whereby paging action can be initiated at the calling stations and paged parties can respond to such paging action by replying through any one of a plurality of reply stations.

A further objects of the invention is to provide a system as aforesaid whereby upon initiation of paging action at any calling station, such calling station is automatically placed in condition to receive a reply from any reply station.

A further object of the invention is to provide a system as aforesaid whereby a single transmitter can be utilized to transmit any one of several paging signals individually characteristic of parties to be paged.

A further object of the invention is to provide a system as aforesaid including means for preventing cross-talk between other calling and/or reply stations and such calling stations and reply stations as are connected for communication with each other.

A further object of the invention is to provide a system as aforesaid wherein the connection of a calling station and a reply station to a common line for communication with each other thereover establishes a circuit condition which inhibits the connection of any other calling station to such line and indicates to such other calling station the existence of a busy condition on the line.

Still another and further object of the invention is to provide a system as aforesaid in which auxiliary DC voltages are superimposed upon the same lines used for direct and paging reply audio cummunication to effect control of switching operations at the calling and reply stations.

Other and further objects and advantages of the invention will become apparent from the following detailed description and accompanying drawings in which.

Figure 1:
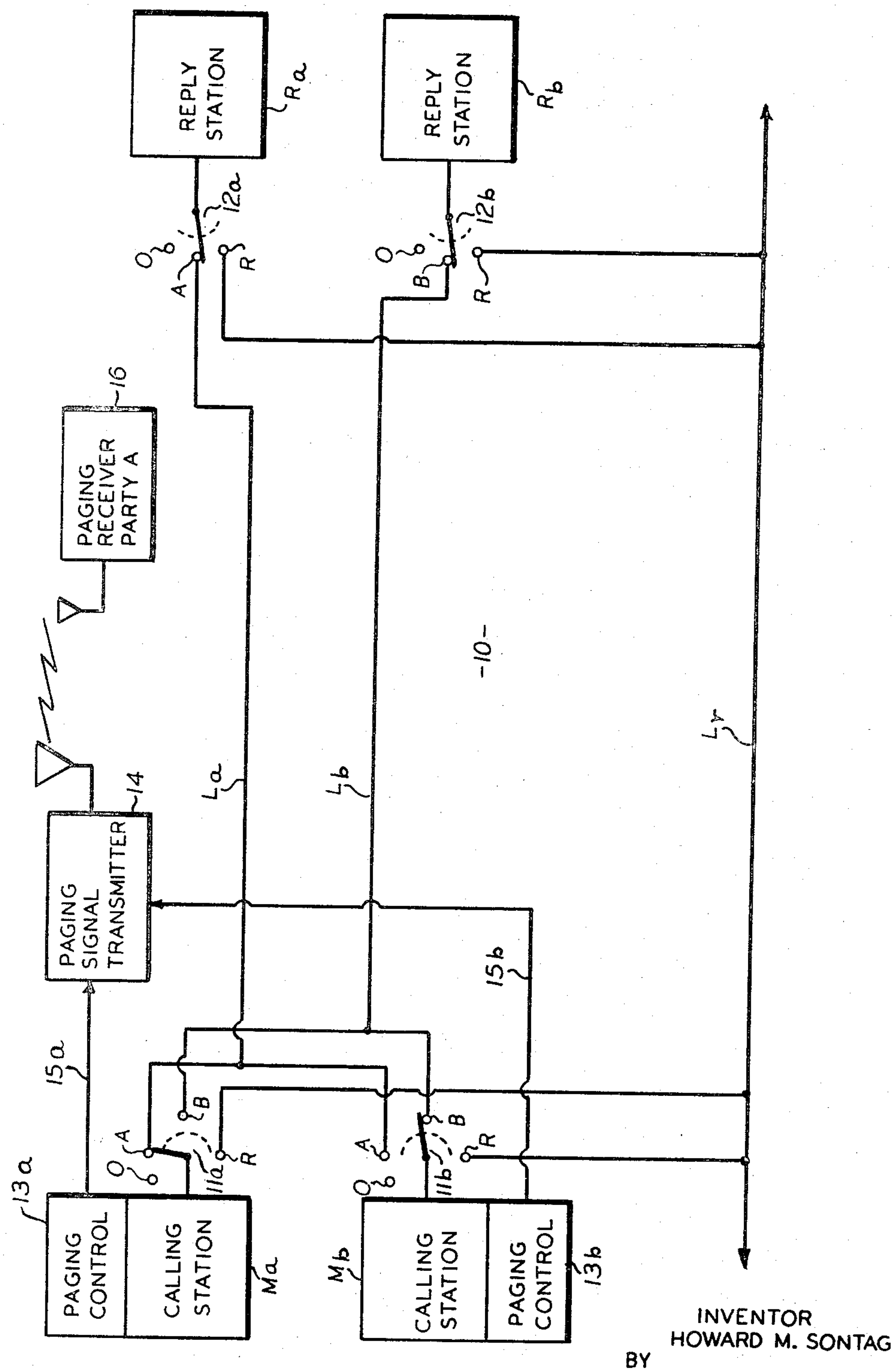
FIG. 1 is a schematic block diagram of a paging communication system according to a preferred embodiment of the invention.

Referring now to FIG. 1, the paging communication system 10 includes one or more calling stations, generally known as master stations, and a plurality of reply or staff stations, two of such reply stations R*a* and R*b* and two calling stations M*a* and M*b* being illustrated for purposes of simplification.

Any number of calling stations and any number of reply stations can be used, and the number of calling and reply stations need not be equal.

The calling and reply stations Ma and Mb and Ra and Rb respectively are conventional intercom stations and include audio amplifiers, microphones and/or loudspeakers and associated power supplies, output line transformers, etc., as needed for converting sound into corresponding audio frequency voltages and vice versa so that back and forth audio communication can be effected between any calling station Ma, Mb and a reply station Ra and Rb connected to a common audio line, such as either of the lines La or Lb. Preferably, the stations Ma, Mb, Ra, Rb are provided with loudspeakers which can be used reversibly as microphones.

If desired, the same type of basic circuit can be used for the calling stations Ma, Mb and the reply stations Ra, Rb as well, since as used herein, the term "calling station" is intended to designate an intercom station which can be connected to any selected audio line La, Lb from the calling location for communication with a corresponding reply station Ra, Rb, whereas the reply stations Ra, Rb can only be connected at their individual locations to either a corresponding audio line La, Lb, or to the reply line Lr. Thus, the calling stations Ma, Mb are distinguished from the reply stations Ra, Rb in that each calling station Ma, Mb is provided with an associated call switching circuit 11*a*, 11*b* respectively for selectively connecting the call station Ma, Mb to an audio line La, Lb for communication with a corresponding reply station Ra, Rb thereover. Also, the call switching circuits 11*a*, 11*b* provide for the selective connection of their associated calling stations Ma, Mb to the reply line Lr for communication with such reply Ra, Rb as is connected thereto by means of an associated reply switching circuit 12*a*, 12*b* respectively.

Hence by the call switching circuit 11*a*, the calling station Ma can be placed in communication with either of the reply stations Ra, Rb, and likewise the calling station Mb can be placed in communication with either of the reply stations Ra, Rb by means of the call switching circuit 11*b*, as in normal direct communication between such stations. Similarly, either call station Ma or Mb can be connected to the reply line Lr for communication with a reply station Ra, Rb connected thereto.

In the specific switching configuration illustrated in FIG. 1, the calling station Ma is shown as being connected to the line La for communication with the reply station Ra, with the calling station Mb being connected to the line Lb for communication with the reply station Rb.

For the specific arrangement of FIG. 1, the call switching circuits 11*a* and 11*b* are each shown as being provided with four switching positions, namely the positions O, A, B and R which correspond respectively to the disconnection of the associated calling station Ma, Mb from the system 10, the connection of the calling station Ma, Mb to the line La, the connection of the calling station Ma, Mb to the line Lb, and the connection of the calling station Ma, Mb to the reply line Lr. The reply switching circuits 12*a* and 12*b* are similarly each provided with three switch positions, O, A and R, for the switching circuit 12*a*, and O, B and R for the switching circuit 12*b*.

For example, when the calling station Ma is not being used, the call switch 11*a* is placed in the O position to free the lines La, Lb and Lr for use by the other call station Mb. For communication with the reply station Ra or Rb from the calling station Ma, the call switch 11*a* is placed in the A, or B position respectively. Likewise, the call switch 11*a* is placed in the R position for communication with either reply station Ra or Rb as is connected thereto via its associated reply switch 12*a*, 12*b*.

To disconnect the reply stations Ra or Rb from the system 10, as when it is desired to prevent reception of all incoming communications thereat, the reply switches 12*a*, 12*b* are placed in the O positions.

Although the lines La, Lb, Lr are illustrated as single conductor lines, and the switch means 11*a*, 11*b*, 12*a*, 12*b* are illustrated as single pole switching devices in FIG. 1 for simplicity, it is understood that preferably the lines La, Lb, Lr each define a paired set of conductors which extend between the calling stations Ma, Mb and the reply stations Ra, Rb which are ordinarily remote from one another, and that the switch devices 11*a*, 11*b*, 12*a*, 12*b* are actually parallel operated two-pole switches for effecting the intended connections and disconnections of the stations Ma, Mb, Ra, Rb to and from the lines La, Lb, Lr.

Ordinarily, communication with a particular party is first attempted from a calling station Ma or Mb by operating the call switch 11*a*, 11*b* to connect such station to the line La, Lb corresponding to the reply station Ra, Rb where the party is believed to be located. If for some reason, such attempt is not successful, as for example, in calling from Ma to Ra, a different party answers, or no answer is received, then paging action is initiated at Ma through the paging control 13*a* located thereat. For this purpose, the paging control 13*a* can be a simple switch operatively connected to a transmitter 14 for activating same to transmit a paging signal characteristic of the party being paged.

As desired, the transmitter 14 can be located either at the calling station Ma or remote therefrom, since the invention merely contemplates a paging signal transmitter 14 which is disposed for activation at each calling station Ma, Mb. With a remote transmitter 14, the activation thereof can be accomplished in a conventional manner at each station Ma, Mb by means of paging control devices 13*a*, 13*b* operatively connected to the transmitter 14 via control lines 15*a*, 15*b*.

Each party intended to be provided with paging service is given a portable receiver 16 which is responsive to his assigned paging signal, and includes means, such as a beep tone generator, buzzer, lamp, etc. (not shown) for indicating the receipt of such paging signal. The paging signal receiver 16 is preferably of the transistorized pocket portable type for convenience in carrying, although any suitable receiver, not necessarily portable, can be used depending upon the normal mobility of the parties to be paged.

Upon initiating paging action at Ma, the call switch 11*a* is operated to connect the station Ma with the reply line Lr to await communication with the paged party thereover. Upon indication by his receiver 16 of receipt of a paging signal, the paged party can then go to any reply station Ra, Rb and operate the reply switch 12*a*, 12*b* thereat to place such station Ra, Rb in connection with the reply Lr, and thereby "meet" the calling party of station Ma for communication over said reply line Lr.

To prevent confusion in the transmission of paging signals to the various parties serviced, the transmitter 14 is constructed so as to provide an encoded paging signal. This coding of the paging signal can be accomplished in numerous ways as for example, by modulation of a radio frequency carrier, or by providing for the transmission of an unmodulated carrier, the frequency of which is selected in accordance with the party to be paged. In any case, the transmitter 14 is so constructed as to be capable of transmitting a number of distinctive paging signals corresponding to the number of parties to be paged. Of course, as used herein, the term "party to be paged" is not necessarily restricted to a party of one person only but such paged party can consist of a group of persons each provided with a receiver 16 responsive to a common coded paging signal.

While other types of paging signal coding can be used, the transmitter 14 is expediently constructed to include a plurality of selectable frequency control elements such as crystals (not shown), one such frequency control element for each distinct frequency paging signal to be provided. Preferably, where frequency coded paging signals are used, the frequencies assigned for the various paged parties are separated sufficiently from one another so as to avoid spurious receiver 16 response.

Although as indicated by FIG. 1, the paging communication system 10 according to the invention can be constructed in a simplified embodiment wherein the call switches 11_a_, 11_b_ and reply switches 12_a_, 12_b_ are manually operated directly at their associated stations, preferably the switching of the calling stations to the audio lines L_a_, L_b_ and the reply line L_r_ is accomplished by means of relays operated with DC currents superimposed upon the audio and reply lines L_a_, L_b_ and L_r_.

Figure 2:
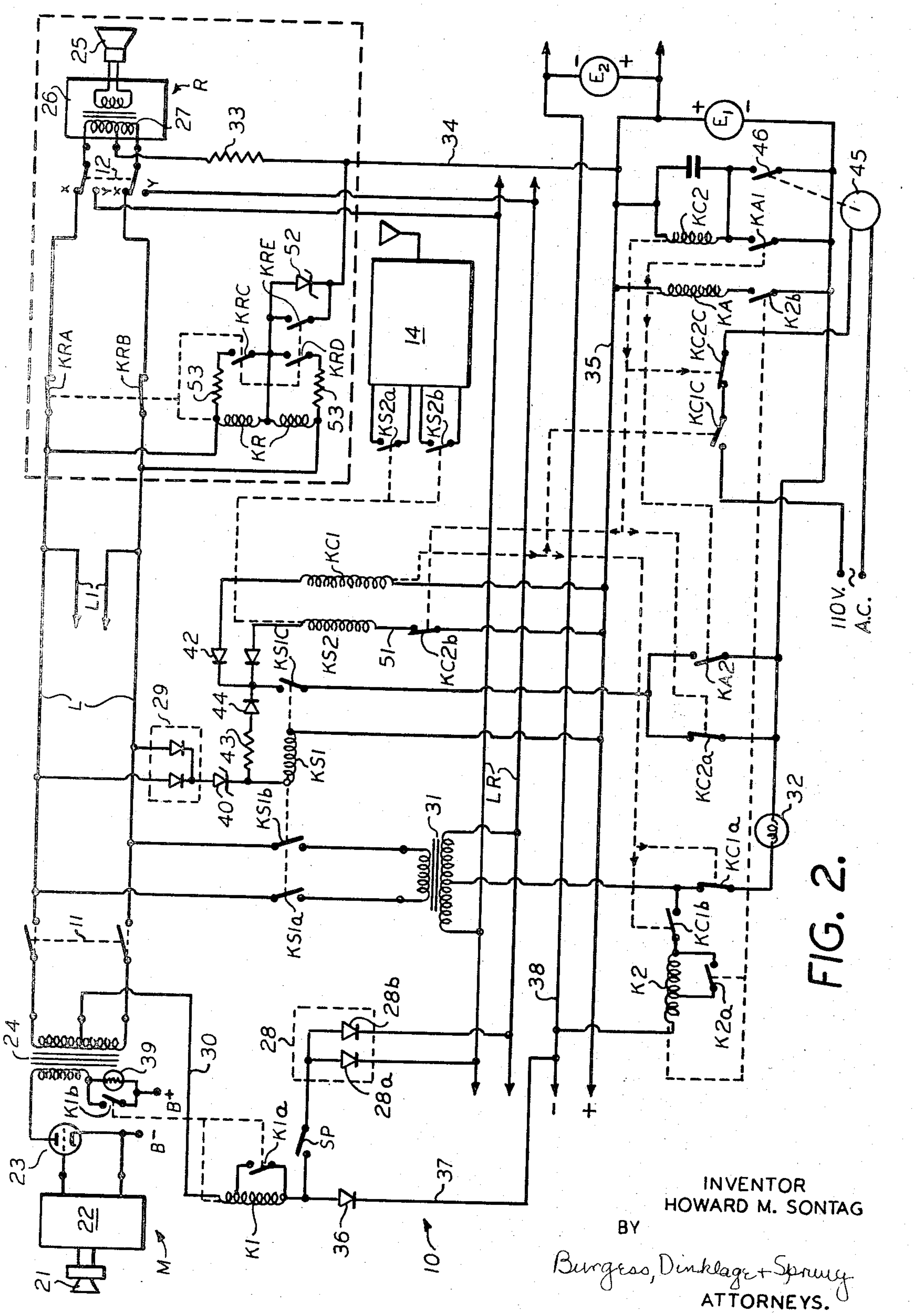
FIG. 2 is a detailed schematic of a typical portion of the paging communication system of FIG. 1.

FIG. 2 illustrates in greater detail an example of a circuit arrangement contemplated by the invention to provide a paging intercommunication system 10 wherein upon initiation of paging action at a calling station, the transmission of a paging signal, the switching of the calling station to the reply line, and the release of the initially contacted reply station are all accomplished automatically by means of relays.

For purposes of simplification, only one calling station M and one reply station R are shown in FIG. 2, said calling and reply station M and R being respectively typical of either one of the corresponding calling and reply stations M_a_, M_b_, R_a_, R_b_ shown in FIG. 1.

The calling station M is represented as including a sound transducer 21 such as a loudspeaker which can be operated reversibly, an input amplifier 22, and an output amplifier 23 which drives a transformer 24 having a center tapped secondary winding.

The reply station R is represented in a somewhat similar manner as including a sound transducer 25 which is preferably a loudspeaker connected for reversible operation to an amplifier 26 having a center tapped line transformer 27. As can be appreciated by those skilled in the art, the simplified representation of the calling and reply stations M and R should not be interpreted as excluding other components and circuits conventionally used in intercom stations.

Throughout the system 10, simplex networks are utilized advantageously to permit the simultaneous transmission of DC voltages and currents for control purposes over the audio line pair L and the reply line pair LR which carry audio voltages and currents for communication purposes. The use of such simplex network arrangements in accordance with the invention permits DC to be carried over the same lines used for communication between the calling station M and replay station R without any interference therewith. For example, when the stations M and R are connected to the line pair L for direct communication with each other, the center tapped windings of the transformers 24 and 27 together with the line pair L define transformer simplex network, because a two-terminal DC source containing circuit can be connected between the center taps of the transformers 24 and 27 so that the resulting DC current flow through each transformer section will be equally balanced. Under such conditions, both lines in the line pair L will be at the same DC potential.

Another example of a simplex network can be found in the diode simplexes 28 and 29 which are each composed of a pair of diodes connected back-to-back.

In the operation of the system 10, the calling station M is connected to the line pair L for communication with the reply station R by closing the call switch 11 which is represented as a two-pole switch 11 to accommodate the two conductor line pair L. At the reply station R, the reply switch 12, also a two-pole switch, is initially in a position whereby the transformer 27 is connected across the line pair L and thus the station R can be considered as being initially on standby to receive communications from the station M. This position of the switch 12 is designated as X with another position Y being provided in the switch 12 to permit the connection of the transformer 27 across the reply line LR as when a paged party uses the paging reply line LR for responding to paging action initated by another party ot the calling station M.

To initiate paging action at the station M, the normally open paging switch SP is momentarily closed. One side of the paging switch SP is connected to the junction of the diodes 28_a_ and 28_b_ of the diode simplex 28, with the other side of the switch SP being connected to the center tap of transformer 24 in series with the coil of a relay K1 and the line 30.

Upon closure of the switch SP, a DC voltage is applied to the line pair L, since the negative side of a DC power supply E1 is connected to the reply line pair LR through the center tapped winding of a transformer 31, such connection being in series with a pilot lamp 32 and the normally closed contact set KC1_a_ of a relay KC1.

Prior to closing switch SP, but after the call switch 11 is closed (indicated by dashed jumper lines), as for example, when the calling party at station M is attempting to communicate with a particular party at station R, or is actually engaged in such communication, the line pair L is at a different DC potential by reason of its connection with a different DC supply E2 through the center tap of transformer 27, resistor 33 and the line 34 which is connected to the common positive bus 35 of the power supplies E2 and E1. Hence, under such conditions the E2 power supply is connected across a series network containing the resistor 33, the coil of relay K1 and a diode 36, the cathode of which is connected by a line 37 to the negative bus 38 of the supply E2. Neglecting the resistances of the lines 34, L, 30, 37, 38 and the windings of the transformers 24 and 27, the line pair L will be at a DC potential corresponding to the terminal voltage of E2 minus the voltage drop across the resistor 33, this potential being negative with respect to the positive bus 35 and positive with respect to the negative bus 38. The actual level of this DC potential on the line pair L will depend upon the effective DC resistance of the coil of relay K1. Because a portion of the relay K1 coil is connected to a normally open contact set K1_a_ of relay K1 for short-circuiting thereby upon operation of relay K1, initially the DC voltage on line pair L will be higher than when after relay K1 operates. This can be readily appreciated by assigning typical resistance values of 47 ohms to resistor 33, 145 ohms to the portion of relay K1 coil which is shorted out by the contacts set K1_a_, and 15 ohms to the remaining portion of the relay K1 coil. With such resistance values, the line pair L will be at an initial voltage of approximately 77% of the terminal voltage of supply E2, and after relay K1 operates, said line pair L will be at a voltage of approximately 24% of the E2 supply terminal voltage. To assure reliable operation and hold in of relay K1 after operating, said relay K1 is constructed to operate with a line pair L voltage somewhat above 24%, but slightly below 77% of the E2 terminal voltage, and after operating, to hold in with a line pair L voltage somewhat lower than 24% of the E2 terminal voltage. For example, a relay K1 which will operate with a line pair L voltage down to 45% of the E2 voltage, but not below, and which will hold in after operating with a voltage of approximately 10% of the E2 voltage can be used satisfactorily.

The reasons for such requirements upon the relay K1 result in the fact that said relay K1 is used to establish a busy condition lock-out for the line pair L, so that once the transformer 24 of station M has been connected thereto, other calling stations (not shown) which are provided with relay circuits similar to K1 will be prevented from calling over the same line pair L.

To implement such busy lock-out function, the relay K1 can be expediently provided with another set of normally open contacts K1_b_ which when closed short-circuit a high resistance pilot lamp 39 connected in series with the primary winding of transformer 24 that functions to couple the audio output of amplifier 23 to the line pair L. For purposes of example, the amplifier 23 is illustrated as having a triode vacuum tube output stage directly coupled to the primary of transformer 24, but as can be appreciated by the artisan, this feature of the invention is by no means restricted to vacuum tube amplifying calling stations M, but can be used in an obviously similar manner with transistorized stations (not shown).

Assuming that another calling station (not shown) is not already connected to line pair L, as for example via the parallel line pair L1, when switch 11 is closed, the relay K1 pertaining to call station M will operate and thereafter hold in so that the lamp 39 will be effectively out of the amplifier 23 output circuit, thereby enabling the audio frequency output of said amplifier 23 to be transmitted over the line pair L as in the normal mode of audio communication from station M to station R.

However, if another station happens to be connected to the line pair L, a relay corresponding to K1 associated with such station will have already operated thereby reducing the DC voltage on line pair L to 24% of the E2 supply voltage. Since the relay K1 associated with station M requires at least 45% of the E2 supply voltage on line pair L in order to operate, said relay K1 will not operate, and its contact set K1*b* will remain open. With a lamp 39 having a relatively high resistance as compared with the primary winding of transformer winding 24, practically all of the audio output of amplifier 23 will be dissipated in a lamp 39, and very little will be fed into the line pair L. Thus, when the line pair L is busy, such condition will be indicated to a party speaking into the transducer 21 at station M by reason of the lamp 39 which will glow with an intensity varying along with that of the speaking party, and substantially no cross talk interference will occur on the line pair L.

Of course, it is assumed that the various parties serviced by the system 10 are cooperative so that when a busy condition is indicated on the line pair L or on any other line paid (not shown) to another relay station (not shown), they will disconnect their respective calling stations from such line by opening the switch associated therewith which corresponds to the switch 11 of FIG. 2. However, a more affirmative lock-out action can be achieved by substituting a set of transfer type contacts for the contact set K1*b* so that the amplifier 23 will normally feed a dummy load such as a lamp 39 and be completely disconnected from transformer 24 until relay K1 operates. This would completely prevent cross talk interference over occupied line pairs such as L.

The system 10 includes another relay K2 which is somewhat similar in construction to the relay K1 in that it has a coil portion shorting contact set K2*a* similar to the contact set K1*a* of the relay K1. Operation of the relay K2 is controlled by a relay KC1 via its contact set KC1*b*, with the current for operating relay K2 derived from supply E2 and the current for operating relay KC1 being derived from a DC power supply E1 which has a higher terminal voltage than the supply E2.

The negative side of the E1 supply is connected through the series lamp 32 and normally closed contact set KC1*a* of relay KC1 to the center tap of transformer 31, and thus with contact set KC1*a* closed both conductors of the reply line pair LR will be at the same negative potential which is more negative than the potential on line 37. The positive side of the E1 supply is connected to the center tap line 30 of transformer 24 through the series resistor 33, transformer 27, line pair L and opposite leg windings of transformer 24.

With the switch 11 closed and the paging switch SP open, current from the E2 supply will flow from the positive bus 35 thereof through line 34, resistor 33, etc., to energize relay K1 and return to the negative bus 38 of the E2 supply through the diode 36.

When the paging switch SP is closed, current conduction through the diode 36 will cease, and relay K1 will be maintained in a held in condition by current supplied from the E1 source, by reason of conduction through the diodes 28*a* and 28*b* of the diode simplex 28. This current cutoff through diode 36 is due to the fact upon closure of switch SP, the anodes of diodes 36, 28*a*, 28*b* are connected in common, so that current conduction occurs only through the diode or diodes having the most negtive cathodes, i.e., diodes 28*a* and 28*b* which have the same cathode potential.

The circuit conditions that occur as a result of closure of the paging switch SP can be more easily visualized by assigning typical values of 24 volts to the E1 supply and 6 volts to the E2 supply.

With such supply voltages, prior to closure of the switch SP, the line pair L will then be at a potential of approximately −4.5 volts with respect to the common positive bus 35 of the supplies E1 and E2 (based upon a typical effective resistance of 15 ohms for the unshorted portion of relay coil K1 and a 47 ohm resistor 33).

Initially upon closure of switch SP, the line pair L will assume a potential of approximately −16 volts with respect to the positive bus 35, with the lamp 32 being a typical 3 volt type lamp. With a 3 volt drop across the lamp 32, the 24 volt E1 supply will divide approximately 5 volts across the 15 ohm coil portion of relay K1 and 16 volts across the 47 ohm resistor 33, thus placing the reply line pair LR at a potential of −21 volts with respect to the positive bus 35.

The relay KS1, which controls the switching of the station M audio output to the reply line R1, has one terminal of its coil connected to the positive bus 35 and the other connected with the line pair L through the combination of a zener diode 40 in series with the diode simplex 29. The zener diode 40 is selected to have a breakdown voltage of approximately 12 volts so that current flow through the relay KS1 will be blocked in the absence of initiating paging action. Such current blocking is necessary to affirmatively prevent operation of the relay KS1 by reason of the 4.5 volts applied to the line pair L from the E2 supply.

When the switch SP is closed a 16 volt difference is applied across the series combination of the diode simplex 29, zener diode 40, and the coil of relay KS1, thereby causing breakdown of the zener diode 40 and current conduction through relay KS1 to operate same.

Operation of relay KS1 in turn initiates operation of relays KS2 and KC1 upon closure of the normally open contact set KS1*c* which connects the diodes 41 and 42 in series with the coils of said relays KS2 and KC1 respectively to the negative side of the E1 supply through the normally closed contact set KC2*a*. Also, closure of the contact set KS1*c* effects a transfer of the negative coil terminal of relay KS1 to the negative side of the supply E1 bypassing the zener diode 40 via the resistor 43 and diode 44. Hence, when the line pair L is restored to the 4.5 volt level upon release of switch SP, the relay KS1 will still be energized by the supply E1. The resistor 43 is chosen so as to provide a compensating voltage drop equivalent to that provided by the breakdown voltage of zener diode 40, so that substantially the same current flow exists through the relay KS1.

Operation of relay KS2 causes the paging signal transmitter 14 to become activated for transmitting a paging signal to the party to be paged, the contact sets KS2*a* and KS2*b* connected into the coding circuitry (not shown) of transmitter 14 representing schematically a means for establishing a coded paging signal corresponding to the identity of a particular party. For simplicity, only one KS2 relay has been illustrated in FIG. 2, and that relay KS2 is the one which has the particular sets of contacts KS2*a* and KS2*b* utilized for establishing the necessary paging signal code.

Where a plurality of parties are to be provided with selective paging services, a corresponding plurality of relays similar to KS2 can be used to provide additional contact sets similar to KS2*a* and KS2*b* to establish a sufficient number of coding conditions. For example, by providing a selector switch (not shown) in the line 50 between the anode of diode 41 and one side of each of the coils of such additional relays (not shown), and by connecting the opposite coil sides of such relays in common to the line 51, any one of such relays can be energized in the same manner as the relay KS2 shown, in order to establish paging signal coding corresponding to a particular party.

Operation of relay KC1 establishes the DC connection of the coil of relay K2 to the reply line LR through transformer 31 by the closure of KC1*b* contact set and the opening of KC1*a* contact set, and also initiates operation of the timer motor 45 by closure of KC1*c* contact set.

Upon closure of the paging switch SP, the reply station R is also disconnected from the audio line L by the opening of contact sets KRA and KRB of relay KR. A zener diode 52, similar in function to the zener diode 40 is connected in series with the positive voltage feed to the balanced split coil sections constituting the coil of relay KR to restrict the activation of said relay KR to when the paging switch SP is closed. However, once the relay KR has been energized, its contact sets KRC, KRD and KRE close to make it self-holding, bypassing the zener diode 52. It should be noted in this respect, that the split coil sections of relay KR define a simplex network connected across the audio line L, i.e., a relay simplex, which is preferably provided with a pair of resistors 53 connected therewith into a shunting resistance simplex network for better equalization across the audio line L.

When relay KR operates, the audio line L (ahead of the reply station R) is DC connected to the positive bus 35 through the coil sections of said relay KR. Hence, even though the former DC connection of the audio line L to the positive bus 35 through resistor 33 has been opened by the opening of contact sets KRA and KRB, the remaining holding contacts sets of relay KR essentially maintain the same DC conditions on line L as existed before the operation of relay KR, with the exception of such voltage drop which occurred through resistor 33.

It should be noted that because of the action of zener diodes 40 and 52, and the various holding action contacts provided on the relays KR and KS1, only a momentary closing of the paging switch SP is required to effect the transfer of the calling station to the reply line LR, the disconnection of the called reply station R from the audio line L, and the transmission of a paging signal having a duration which can extend beyond the release of switch SP.

When the paging switch SP is released, the audio line L is DC connected to the negative side 38 of the E2 supply, and the relay KR coil is energized thereby. However, the coils of relays KS1, KS2 and KC1 are still energized by the E1 supply through the closure of contact set KS1*c* which is connected in series with the contact set KC2*a* to the negative side of the E1 supply.

As thus far described, the calling station M is connected to the reply line LR awaiting a reply from the paged party thereover, as the paging signal is being transmitted or has been transmitted. To prevent tie-up of the paging system, the duration of paging signal transmission is preferably limited by a timer means including the timer motor 45 and switch 46. The timer motor 45, which can be expediently operated from a conventional 110 volt AC supply, is started upon initiation of the paging signal treansmission by the closure of contact set KC1*c*, which actually occurs shortly after the operation of relay KS1 since relay KC1 requires the operation of relay KS1 first.

After a predetermined interval of paging signal transmission, as corresponds to the setting of the timer switch 46, and is counted from the time contact set KC1*c* closes, the switch 46 is closed to operate relay KC2. Operation of relay KC2 results in the termination of paging signal transmission because its contact sets KC2*a* and KC2*b* open to break the current flow through the coils of relays KS1, KS2 and KC1. Actually, for this function, the contact set KC2*b* which opens the coil circuit of relay KS2 is redundant, because with the paging switch SP open, zener diode 40 is in a current blocking condition so that all three of these relays KS1, KS2 and KC1 will be de-energized upon opening of the contact set KC2*a* alone. However, the contact set KC2*b* is provided to silence the paging signal transmitter 14 in the event that the contact set KA2 should close as occurs when the paged party answer over the reply line LR. Another contact set KC2*c* of relay KC2 interrupts the timer motor 45 and thereby serves as a resetting means for the paging signal timer switch 46.

In addition, operation of relay KC2 results in the calling station M being disconnected from the reply line LR unless an answer is received, since the opening of the coil circuit of relay KS1 restores its contact sets KS1*a* and KS1*b* to their normally open state. This frees the reply line LR for use by other calling stations (not shown) and further prevents the tie-up of the paging system.

Assuming that the paged party in response to the receipt of a paging signal desires to answer the calling party at station M, this can be done simply by going to any reply station not necessarily the same station R, and placing the reply switch 12 thereat in the Y position. This connects the reply station R to the reply line LR for audio communication with the calling party waiting thereupon, assuming that no disconnection of the calling station M from the reply line LR has occurred.

In addition, the reply line LR is DC connected to the positive bus 35 via the series resistor 33. Because when the contact sets KS1*a* and KS1*b* are closed, as they are when the calling station M is coupled to the reply line LR, the relay KC1 is in a normally operated state so that its contact sets KC1*a* and KC1*b* effect a DC connection of the coil of relay K2 to the reply line LR. Thus, when the paging party answers and thereby connects the reply line LR with the positive bus 35, relay K2 is energized and operates to close its normally open contact sets K2*a* and K2*b*.

Operation of relay K2 in turn effects operation of relay KA by reason of contact set K2*b* closing. In turn, operation of relay KA also effects operation of relay KC2 independently of the timer switch 46, thereby silencing the paging transmitter 14 via opening of contact set KC2*b*, and yet permits relays KS1 and KC1 to remain held in the operate state because contact set KA2 closes before contact set KS2*a* can open under such conditions. Also, with the operation of relay KC2, its contact set KC2*c* opens to reset the timer switch 46 to its normally open state and to interrupt the operation of the time motor 45. Thus, upon operation of relay KA, the calling station M remains coupled to the reply line LR for unlimited communication with the paged party, or in fact any party who answered by switching the reply switch 12 at station R to the Y position.

After the communication between the calling station M and answering reply station R is completed over the reply line LR, the reply switch 12 can be reset to the X position by the answering party for normal reply station R operation thereafter, and the call switch 11 can be opened, or switched off or to another reply station (not shown), by the calling party to permit resetting of relay KR to its normal state. Actually, as shown in FIG. 2, it is only necessary to open the call switch 11 to effect reset of relay KR, but any other conventional means, such as a switch (not shown) operable at the reply station can be provided for such purpose.

As can be noted from FIG. 2, the relay K2 like the relay K1 is provided with a coil portion shorting contact set K2*a* which closes upon operation of relay K2. This establishes a busy condition upon the reply line LR. When the reply line LR is being used for communication between the stations N and R, the reply line LR will be at a DC voltage which is slightly positive with respect to the negative side 38 of the E2 supply. Since the cathode of diode 36 is directly connected to the negative side 38, closure of the paging switch SP cannot effect any further paging action during use of the reply line LR either by the station M or any other station (not shown) similarly equipped with a parallel connected paging switch and diode simplex corresponding to the switch SP and diode simplex 28. Furthermore, once contact set K2*a* closes, another station (not shown) having a relay similar to K2 will not be able to operate such K2 type relay by parallel connection with the relay K2, since closure of contact set K2*a* reduces the DC voltage level on the reply line LR.

As can be appreciated by the artisan, the paging system of the invention provides for the automatic transfer of the calling station M to the reply line LR upon initiation of paging action, the feeding of the audio line L, the limiting of paging signal duration, and the overriding of such limiting on the use of the paging feature when a paged party answers over the reply line. Furthermore, the invention provides for the automatic resetting of the relays and switches used for performing such functions.

In general, the operation of the paging system 10 may be summarized as follows:

Upon closure of the paging switch SP, the calling station is connected to the reply line for audio communication thereover while yet complete DC isolation between the audio line L and reply line LR is retained. An overall system busy condition is automatically established to lock out any other station from using the paging feature so as to prevent false calls from being transmitted to pocket receivers and cross talk between various stations in the system. The paging station M is disconnected from its previously established audio connection with the reply line after a predetermined interval, which may be adjustable, established by the timer motor 45 and switch 46 combination, should the paged party fail to answer. Such timed disconnection action is stopped when the paged party answers over the reply line LR thereby giving the advantage of freeing the system after a reasonable interval for use by other stations and yet allowing unlimited communication time when contact between the calling and paged parties has been established over the reply line. The paging signal transmitter is automatically activated to transmit a selected coded paging signal necessary to contact the receiver 16 of the paged party. Transmission of the paging signal is terminated when reply action is taken or when the timing circuits disconnect the calling party. Upon return of the calling station to a standby condition (opening of switch 11) and the paged parties releasing of reply switch 12 for restoration to the X position, all circuits previously established for automatic connection for communication over the reply line are restorted to their initial standby states to permit further paging action by the same station M or other calling stations.

What is claimed is:

1. A paging communication system which comprises a calling station, a plurality of reply stations, circuits means defining a corresponding set of primary audio communication lines between said calling station and each of said reply stations, circuit means defining a paging reply line for audio communication between said calling station and any single reply station, a call switching circuit means for selectively connecting said calling station to an audio communication line corresponding to a given reply station for audio communication therewith via said last-mentioned line, and for selectively connecting said calling station to said paging reply line for audio communication with a reply station connected to said last-mentioned line, a reply switching circuit means associated with each of said reply stations for selectively connecting said reply station to its corresponding audio communication line for communication with the calling station thereover and for selectively connecting said reply station to said paging reply line for audio communication with the calling station thereover, a paging signal transmitter disposed for activation at said calling station to transmit a paging signal characteristic of a party being paged, and a receiver responsive to such transmitted paging signal, said receiver including means for indicating the receipt of such paging signal to a party being paged thereby, whereby when communication with such party is unsuccessfully attempted from the calling station to a selected reply station via the corresponding audio communication line, said party can be paged by activating the paging signal transmitter, and by connecting said calling station to the reply line via said call switching circuit means, said calling station can be placed in audio communication with any reply station connected to said reply line by its associated reply switching circuit means, whereupon the paged party upon indication of the receipt of the paging signal via said receiver indicating means can effect audio communication with the calling station through any reply station by connecting same to the reply line via its associated reply switching circuit means.

2. The paging communication system according to claim 1 including control circuit means operatively connected to said call switching circuit means and to said paging signal transmitter for activating same and for effecting connection of said calling station to the reply line by said call switching circuit means upon activation of said paging signal transmitter.

3. The paging communication system according to claim 1 including resettable timer means operatively connected to said paging signal transmitter to effect the transmission thereby of a paging signal having a predetermined duration upon each activation of said transmitter.

4. The paging communication system according to claim 1 including resettable timer means operatively connected to said call switching circuit means for disconnecting said calling station from the reply line at a predetermined time interval after the calling station has been connected thereto by the call switching circuit means.

5. The paging communication system according to claim 1 wherein said call switching circuit means includes a transfer switching circuit responsive to a uni-directional electric potential for effecting a transfer coupling of the calling station to the reply line where said calling station is initially connected with a reply station for audio communication therewith via a primary audio line, said transfer switching circuit being operatively connected with the reply switching circuit means associated with said reply station for effecting the disconnection thereof from said audio line in response to said electric potential, and including a source of uni-directional electric potential and switch means operatively connected to said source and to said transfer switching circuit for selectively applying such electric potential thereto.

6. Paging communication system which comprises a calling station, a reply station, circuit means defining a primary audio communication between said calling and reply station, circuit means defining a paging reply audio communication line between said calling and reply stations, a call switching circuit means operatively connected to said calling station for selectively coupling same to the primary audio line and for selectively coupling said calling station to the paging reply line, a reply switching circuit means operatively connected to said reply station for selectively coupling same to the paging reply line, said reply switching circuit means being disposed to normally couple said reply station to the primary audio line, and a paging signal transmitter disposed for activation at the calling station to transmit a paging signal to a receiver for indication thereby to a paged party, whereby communication with the reply station can be effected by coupling the calling station to the primary audio line via the operation of the call switching circuit means, and communication with a selected party can be accomplished by operating the call switching circuit means to couple the calling station to the reply line, and by paging such party with the transmission of a paging signal, whereupon when the paged party goes to the reply station in response to the indication by a receiver of the transmitted paging signal, said paged party can be placed in communication with the calling station through the reply station by operating the reply switching circuit means to couple said reply station to the reply line.

7. The paging communication system according to claim 6 wherein said call switching circuit means is responsive to the activation of the paging signal transmitter to couple the calling station to the reply line upon activation of said transmitter.

8. The paging communication system according to claim 6 wherein said reply switching circuit means is responsive to the activation of the paging signal transmitter to de-couple said reply station from the primary audio line upon activation of said transmitter.

9. The paging communication system according to claim 6 including timer means operatively connected with said paging signal transmitter and responsive to the activation thereof to terminate paging signal transmission thereby at a predetermined time after said transmitter is activated.

10. The paging communication system according to claim 7 including timer means operatively connected with said paging signal transmitter and responsive to the activation thereof to terminate paging signal transmission thereby at a predetermined time after said transmitter is activated, said timer means being also operatively connected with the call switching circuit means to de-couple the calling station from the reply line at said predetermined time.

11. The paging communication system according to claim 7 including timer means operatively connected with said paging signal transmitter and responsive to the activation thereof to terminate paging signal transmission thereby at a predetermined time after said transmitter is activated, said timer means being responsive to the coupling of the reply station to the reply line by the reply switching circuit means and operatively connected with the call switching circuit means to decouple the calling station from the reply line at said predetermined time in the absence of the reply station being coupled to said reply line.

12. The paging communication system according to claim 7 including circuit means containing a D.C. electric source and operatively connected to said primary audio line to superimpose a D.C. voltage thereupon in response to the activation of the paging signal transmitter, and wherein said call switching circuit means is responsive to said superimposed D.C. voltage to effect coupling of the calling station to the reply line, whereby when said transmitter is activated, the calling station is coupled to the reply line.

13. The paging communication system according to claim 12 wherein said reply switching circuit means is responsive to said superimposed D.C. voltage on the primary audio line to de-couple said reply station therefrom, whereby when said transmitter is activated, the calling station is coupled to the reply line, and also, the reply station is de-coupled from the primary audio line.

14. The paging communication system according to claim 11 including circuit means containing a D.C. electric source and operatively connected to said reply switching circuit means and to superimpose a D.C. voltage upon the reply line when said reply station is coupled thereto by the reply switching circuit means, and wherein said call switching circuit means is responsive to said superimposed D.C. voltage to maintain the calling station, previously coupled to the reply line upon activation of the paging signal transmitter, in such coupled condition regardless of the elapsed time since said transmitter was activated.

References Cited

UNITED STATES PATENTS

| | | | |
|---|---|---|---|
| 1,538,141 | 5/1925 | Stevens | 179—18 |
| 2,913,533 | 11/1959 | Gatzert et al. | 179—18 |
| 3,114,142 | 12/1963 | Bode et al. | 340—311 |

ROBERT L. GRIFFIN, *Primary Examiner.*

B. V. SAFOUREK, *Assistant Examiner.*